Aug. 20, 1963  R. C. WEBSTER ETAL  3,101,052
ROCKET
Filed Aug. 30, 1960  4 Sheets-Sheet 3

INVENTORS
ROLAND C. WEBSTER,
WALTER CAMERON ROBERTS, JR. &
MILLARD LEE RICE
BY Martha L. Ross
AGENT

Fig. 3.

INVENTORS
ROLAND C. WEBSTER,
WALTER CAMERON ROBERTS, JR &
MILLARD LEE RICE
BY Martha L. Ross
AGENT 3,101,052
ROCKET
Roland C. Webster, Annandale, Walter Cameron Roberts, Jr., Alexandria, and Millard Lee Rice, Annandale, Va., assignors to Atlantic Research Corporation, Fairfax County, Va., a corporation of Virginia
Filed Aug. 30, 1960, Ser. No. 52,989
10 Claims. (Cl. 102—49)

The present invention relates in general to rocket projectiles, and more particularly to rocket vehicles designed for conducting atmospheric soundings, high altitude experiments, and the like.

It has been recognized that it would be desirable to develop a high-altitude atmospheric sounding rocket vehicle which would be relatively inexpensive and capable of carrying substantial instrumentation payloads to obtain measurements and conduct experiments in high altitude regions, for example in the range of 80,000 feet to 300,000 feet. Such a device would be an extremely useful tool for stratospheric meteorologists and high altitude scientists in making meteorological measurements and high altitude experiments of various types. However, because of the delicate instrumentation to be employed in the payload of such a rocket vehicle, special design requirements are imposed, in order to achieve desired properties of low initial velocity so as to minimize deleterious aerodynamic heating effects, and low peak accelerations must be provided to protect the instrumentation. Such rocket vehicles also must be of rugged construction and reliable performance to render them suitable for use in all weather conditions. Further, the construction should be such as to facilitate field mounting of the instrumentation in the rocket vehicle, and means should be provided to reliably achieve peak altitude separation of the instrumentation payload from the rocket motor case and return of the instrumentation package to the ground by parachute, and at the same time to achieve effective separation of the instrumentation package and parachute and effective deployment of the parachute at high altitude in such a manner as to avoid disturbance or damage to the delicate instruments.

An object of the present invention, therefore, is the provision of a high altitude atmospheric sounding rocket vehicle construction having a payload and nose cone assembly which can be readily assembled with the rocket motor case in the field to facilitate field selection of the components of the payload.

Another object of the present invention is the provision of a novel high altitude sounding rocket vehicle including an instrument package, a surrounding nose cone and a parachute subassembly which are separable at peak altitudes from the motor case, wherein the separation means will cause the parachute and instrument package to be expelled from the burned out rocket motor and the parachute to be deployed at sufficiently low acceleration to avoid disturbance or damage to the components of the instrument package.

Another object of the present invention is the provision of a novel high altitude atmospheric sounding rocket vehicle assembly having a separable nose cone, an instrument package to be housed within the nose cone, and a rocket motor case together with means for achieving peak altitude separation of the nose cone, instrument package and motor case from each other, wherein the parts may be readily modified in the field to adapt the assembly to a wide selection of instrumentation to meet different experiment and measurement conditions.

Other objects, advantages and capabilities of the present invention will become apparent from the following detailed description, taken in conjunction with the accompanying drawings illustrating preferred embodiments of the invention.

In the drawings:

FIGURES 1a and 1b together form a vertical, longitudinal section view of a rocket vehicle constructed in accordance with the present invention, illustrating the relative positions of the components of the assembly prior to ignition of the rocket motor;

FIGURE 7 is a fragmentary enlarged section view of the adjacent nose cone and instrument base plate section showing the position of these components prior to breakage of the cord interconnecting the parachute with the aft closure of the parachute container section;

Referring to the drawings wherein like reference characters designate corresponding parts throughout the several figures, the rocket vehicle of the present invention, indicated generally by the reference character 10, is an elongated thin body of conventional rocket-shaped configuration formed of three principal sections, the rocket motor section 11 which constitutes the rearmost section of the vehicle, a parachute container section 12 which forms the intermediate or middle section of the vehicle, and the nose cone section 13 which is the forwardmost section of the vehicle and houses the payload. The ensuing description of a preferred example of the present invention will be directed to a form wherein the payload is an instrumentation package for making high altitude meteorological studies. The rocket motor section 11 includes an outer tubular steel shell 14 forming a rocket motor case lined with insulation 15 to provide a generally cylindrical chamber in which is housed an end-burning solid propellant grain 16 inhibited along its outer periphery by an inhibitor coating or liner 17, or by inhibitor bonding of the grain to the motor casing or motor casing liner, to control burning at the outer peripheral surface of the grain 16. The rearmost portion of the rocket motor section is tapered in a rearwardly convergent fashion as indicated at 18, and a nozzle is formed within the rocket motor case for example by a graphite nozzle insert 20 fixed onto a thickened tapered rearmost portion 21 of the insulation liner 15 providing a jet thrust nozzle passageway 22. A conventional igniter assembly 23 is fitted in the nozzle insert 20 to be ignited by suitable remote control means interconnected with the igniter assembly by electrical wiring and effect ignition of the end-burning propellant grain 16.

The rocket motor section 11 is also provided with four radial double wedge fins 24 having flanged bases 25 which are bolted to the shell 14 in the trailing convergent portion thereof by bolts 26 extending through suitable slots in the flanged bases 25 to permit adjustment of the alignment of the fins 24.

The forwardmost end of the rocket motor section 11 is provided with an annular retaining ring 27 which is fixed to the forwardmost portion of the outer tubular shell 14, for example by spot welding, and supports a transversely extending head closure 28 which forms the forward closure for the propellant grain housing chamber. The head closure 28 in the preferred embodiment herein illustrated is held in place by a suitable split metal ring 29 projecting into an accommodating inwardly opening groove in the retaining ring 27 and suitable sealing means such as the O-ring seals 30 and 31 are provided to effect a seal between the head closure 28 and retaining ring 27, and between the retaining ring 27 and the tubular shell 14.

The parachute container section 12 is disposed immediately forwardly of the rocket motor section 11 and includes an outer barrel 32 of aluminum or other suitable material which is permanently attached to the retainer ring 27 of the rocket motor section 11, for example by the threads 33, to secure a strong, rigid interconnection between the rocket motor section 11 and the section 12 which will withstand the aerodynamic loads and to maintain proper alignment of the forward section of the missile. The outer barrel 32 forms a forwardly opening cylinder which encases an inner parachute container formed of a split shell, preferably made of plastic, consisting of shell halves 34 and 35. The inner parachute container formed by the elements 34 and 35 houses a parachute assembly generally indicated by the reference character 36, designed to be expelled along with the split plastic shell formed by the shell halves 34 and 35 by means of a piston-forming aft closure 37 of circular configuration whose periphery closely conforms to the configuration of the inner surface of the outer barrel 32 and is stepped as indicated at 38 to provide a shoulder which abuts the rear edges of the split shell halves 34 and 35.

The rearmost portion of the outer barrel 32 is provided with a thickened annular region indicated at 39 to form an annular forwardly facing shoulder against which the aft closure 37 is located, there being provided a suitable resilient sealing gasket 40 on the rear surface of the aft closure 37 in the zone of the periphery thereof which projects between the forwardly facing shoulder of the thickened portion 39 and the aft closure 37 and against the inner surface of the outer barrel 32 during movement of the aft closure 37 along the barrel 32 to effect a seal between the aft closure 37 and the barrel 32.

The forward end of the parachute housing container formed by the barrel 32 is closed by a closure plate 41 extending transversely across the parachute container section 12 near but spaced rearwardly from the forwardmost edge of the outer barrel 32 to leave a forwardly opening, cup-shaped chamber at the forward end of the section 12. The forward closure 41 is normally held in position by shear pins 42 which extend through apertures 43 in the outer barrel 32 adjacent the forwardmost end thereof and into suitable sockets 44 extending radially inwardly from the periphery of the closure plate 41.

Figure 1B:
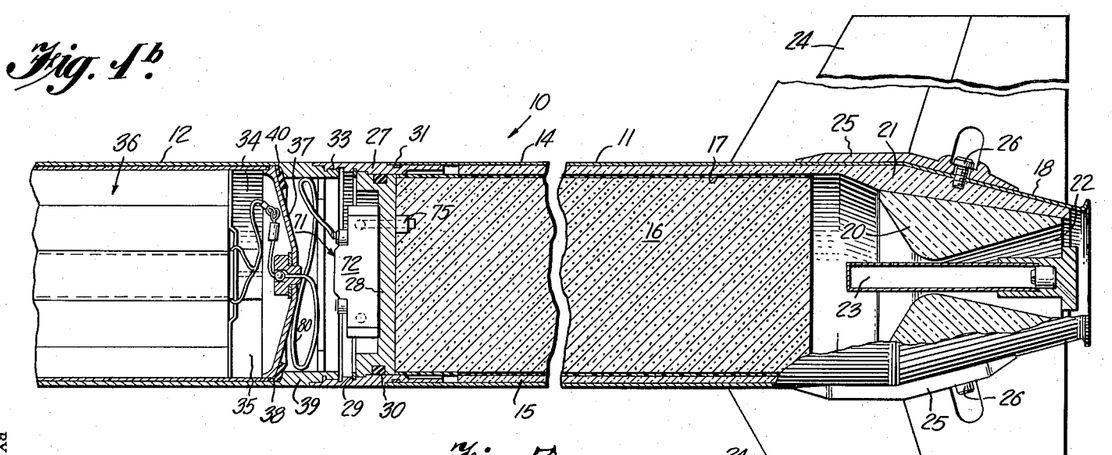
Figure 2:
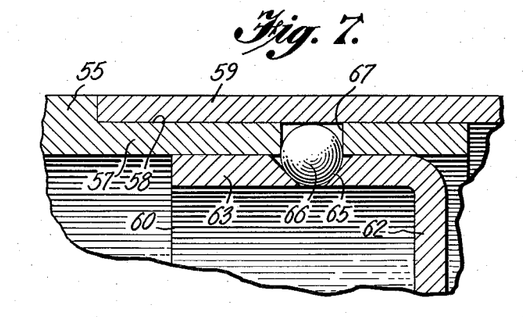
FIGURE 2 is a fragmentary vertical longitudinal section view of portions of the rocket vehicle, illustrating the relative positions of the components immediately following partial expulsion of the instrument package, nose cone and parachute from the burned out motor case.
Figure 3:
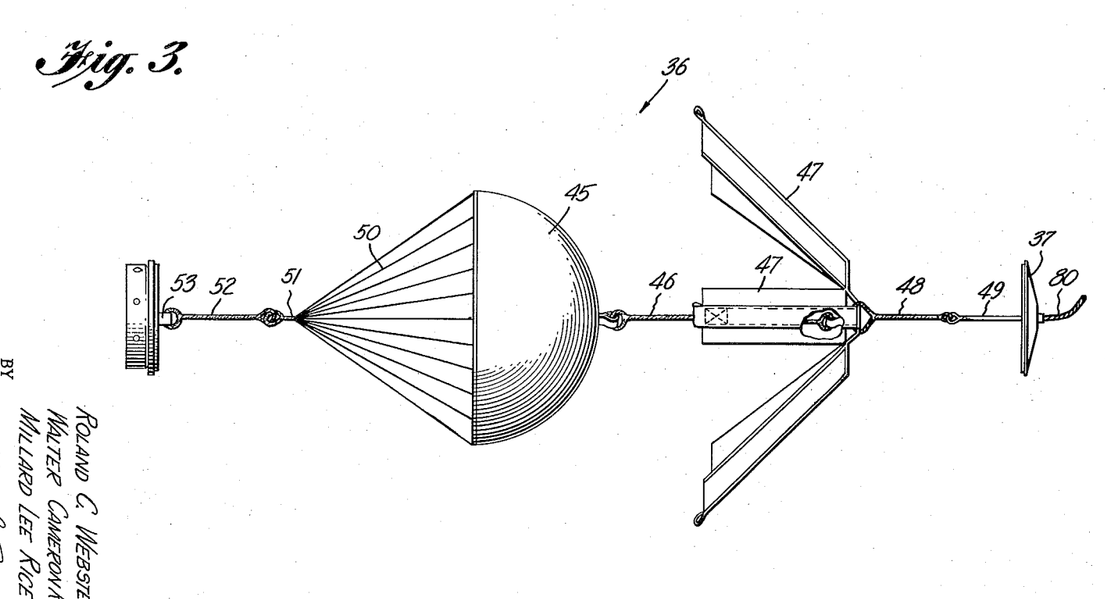
FIGURE 3 is a diagrammatic elevation view of the components of the parachute package and indicating the deployment sequence of the parachute.

The components of the parachute assembly 36 are more clearly illustrated in FIGURE 3, and include a parachute canopy 45, to the crown of which is secured a cord 46 of low breaking strength connected at its leading or forward end to foldable parachute pack elements 47, which in turn are connected by a high breaking strength cord or cable, in the exemplary embodiment formed of a nylon cord section 48 and a wire rope 49, to the center of the piston-forming aft closure 37. Extending in the opposite direction from the parachute canopy 45 are the shroud lines 50 converging to a shroud apex 51 from which a high test strength cord 52 extends to the center of the forward closure 41 to which the cord 52 is securely connected by extending the cord 52 through the eye of an anchoring stud 53 having a threaded stem 53a projecting through and forwardly of the forward closure 41. The anchoring stud 53 is held against rotation in the forward closure 41 by an extension and pin 54 seated in a socket in the closure 41 or any other suitable means for holding the stud 53 against axial displacement. The parachute should be stable in the 200,000 to 100,000 foot altitude range to permit accurate wind measurement through radar tracking and should slow the descent of the instrument and package payload enough to allow recording and transmission of atmospheric data in this region. In a preferred practical example, a 15 foot flying diameter baseball-elliptical type parachute, employing a bag deployment technique and providing a stable descent rate of about 400 feet per second at 200,000 feet with a 6.5 pound payload and slowing to about 270 feet per second at 175,000 feet and about 175 feet per second at 150,000 feet has proved satisfactory. As a specific example, the low breaking strength cord 46 may be cotton cord of about 4 pounds test strength.

The nose cone section 13 includes a hollow nose cone 55 having a pointed forward tip 56 and an open rear end portion 57 having an annular rabbet or lap-joint recess 58 in the outer periphery thereof extending for a selected distance from the rearmost edge of the nose cone to receive the forwardly projecting apron portion 59 of the outer barrel 32 extending beyond the forward closure 41.

An instrument base plate or closure 60 for the hollow interior of the nose cone 55 extends transversely across the bore or chamber 61 immediately adjacent the rearmost edge of the nose cone and includes a transverse wall 62 and a forwardly projecting annular peripheral flange 63. The instrument base plate 60 is attached to the nose cone 55 by fastening means which are extremely flexible in nature to facilitate field assembly of the nose cone 55 onto the instrument base plate 60 in the field after the desired instruments have been mounted on the instrument base plate and render the rocket vehicle readily adaptable to achieve automatic separation of the nose cone from the instrument base plate at peak altitudes or to retain the nose cone assembled to the instrument base plate in encasing relation to the instruments. To this end, the forwardly projecting peripheral flange 63 of the instrument base plate 60 is provided with a series of uniformly circumferentially spaced sockets 64 which in the preferred form herein shown are provided with a conical wall 65 of appropriate depth and configuration to receive approximately the lower half of the steel balls 66. The surrounding portion of the nose cone 55 encircling the flange 63 of the instrument base plate 60 is also provided with a series of cylindrical apertures 67 of substantially the same diameter as the steel balls 66 and disposed to register with the socket 64, the depth of the sockets 64 and apertures 67 being sufficient to dispose the surfaces of the steel balls 66 substantially flush with the circumferential surface of the rabbet 58 and with the forwardly projecting apron portion 59 of the outer parachute container barrel 32. Thus when the nose cone 55 and parachute container section 12 are assembled together with the forwardly projecting apron portion 59 lapping over the rearmost portion of the nose cone 55 and lying within the annular rabbet 58, the apron portion 59 forms a retaining surround or collar holding the steel balls 66 within the apertures 67 and sockets 64 and thereby securely interlocking the nose cone 55 with the instrument base plate 60. When the inner components of the parachute container section 12 including the forward closure plate 41 are expelled forwardly through the forwardmost end of the barrel 32 upon movement of the piston-forming aft closure 37, the nose cone 55 and interlocked instrument base plate 60 are also expelled forwardly through the open forward end of the barrel 32, so that when the steel balls 66 pass forwardly of the forward-most end of the barrel 32, they are freed of the restraining effect of the apron portion 59 and will be dislodged from their sockets 64 and apertures 67 and fall away allowing the nose cone to separate from the instrument package in a manner to be more fully described hereafter. The nose cone 55 and instrument base plate 60 are also provided with a series of countersunk tapped openings 64′ and tapped openings 67′ which are aligned with each other and disposed at circumferentially spaced points between the sockets 64 and apertures 67 to receive flat-head screws for retaining the nose cone 55 and base plate 60 in assembled condition when the parachute assembly and associated components are expelled from the rocket motor case. This provides a more flexible construction which can be readily adapted in the field for a variety of sounding applications.

The central portion of the instrument base plate 60 has a mounting nut 68 which is fixed to the instrument base plate 60 by means of rivets 69 and registers with an aperture 70 in the wall 62 of the instrument base plate to receive the threaded stem 53a of the anchoring stud 53 on the forward closure 41 therein. Thus, the subassembly of the nose cone 55 and instrument base plate 60 after they have been assembled together, can be readily coupled to the parachute container section 12 and rocket motor section 11 of the rocket vehicle by merely slipping the rearmost portion of the nose cone and instrument base plate subassembly into the forwardly opening cup-shaped chamber defined with the apron portion 59 of the outer barrel 32 and rotating the nose cone relative to the parachute container and rocket motor sections to thread the stem 53a of the anchoring stud 53 into the mounting nut 68.

In a preferred practical embodiment, the nose cone 55 may be a four caliber secant ogive having a maximum diameter in the hollow of the nose cone of slightly over four inches and a maximum length of slightly over twenty inches, providing a volume of about 140 cubic inches for instruments, the cone being formed for example from aluminum material with stainless steel tips, glass-phenolic and asbestos phenolic resins or other suitable plastic or metallic materials.

To accomplish separation of the payload from the rocket vehicle at the peak altitude of the vehicle, a separation device generally indicated by the reference character 71 is provided in the head closure 28 of the rocket motor section 11 between the head closure 28 and the piston-forming aft closure 37 of the parachute container section 12. In general, the separation device 71 employs a pyrotechnic delay, which is activated as the propellant burns out to ignite a gas generating separation charge after a predetermined length of time, allowing the missile to coast to peak altitude before separation, and then expell the parachute and instrument package together with the attached nose cone from the burned out rocket motor.

The separation device 71 in one practical embodiment includes a gas generator unit 72 mounted on the front of the head closure 28 having a chamber 73 therein which incorporates a gas generating charge composition and a pyrotechnic delay column indicated by the reference character 74 of suitable length extending through the gas generator housing and through an aperture or section of the column extending axially through the head closure 28 which terminates in an actuator 75 at the ignition end of the column in communication with the solid propellant grain 16 at a location to achieve ignition of the pyrotechnic delay column composition at a selected time just prior to burn-out of the propellant grain 16. The pyrotechnic delay column is selected to have a length, and therefore delay time from ignition of the actuator 75 to ignition of the gas generating charge composition to permit the missile to coast to peak altitude before separation. The gas generator unit 72 is not an explosive type of device in the ordinary sense of the term, but is a gas generating device wherein the charge has a burning rate designed to produce a rate of gas generation within the confined chamber defined between the piston-forming aft closure 37 and the head closure 28 which substantially matches the volume increase in this chamber as the piston-forming closure 37 travels outwardly to maintain substantially even expulsion pressure after the aft closure 37 is freed to move by production of sufficient gas pressure to break the shear pins 42. For example the gas generator charge composition may be formed of boron potassium nitrate in the form of annular disks assembled together in an annular cylindrical, axially aligned group of disks inhibited by bonding at their outer peripheries and interfaces and ignited at one end of the group to produce increasing pressure with time in a generally linear fashion as the burning area progressively increases.

Figures 4, 5, 6, 10:
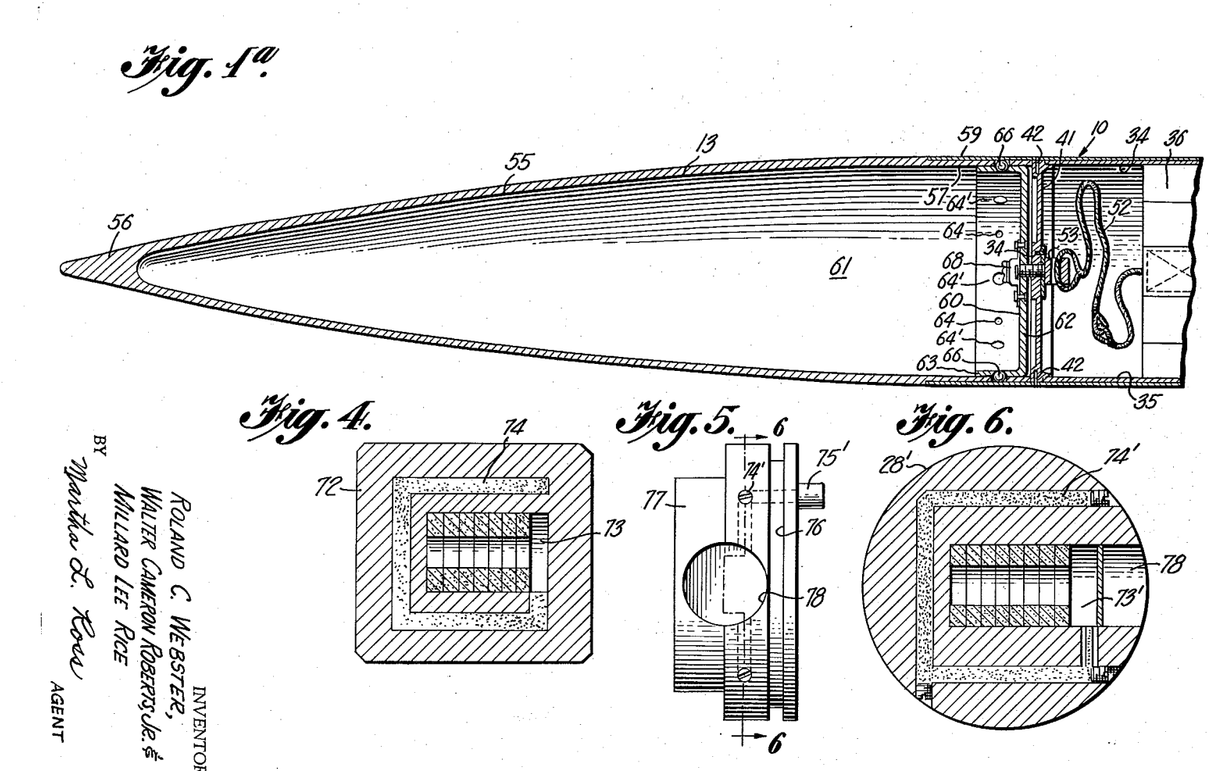
FIGURE 4 is a transverse section view of one form of gas generator separation device that may be used.
FIGURE 5 is a side elevation view of a modified form of head closure for the rocket motor section incorporating a separation device.
FIGURE 6 is a vertical transverse section view taken along the line 6—6 of FIGURE 5.

In another practical construction, the pyrotechnic delay and gas generator may be incorporated in an especially designed head closure 28′ of the type illustrated in FIGURES 5 and 6, having a larger diameter, rearwardly disposed portion 76 and a small diameter forwardly projecting cylindrical portion 77, the larger diameter portion being adapted to be snugly fitted in the retainer ring 27 at the forward end of the rocket motor section 11 in contact with the inner surface thereof. A bore 78 drilled transversely through the head closure 28′ along a diametric axis thereof and centered upon the plane or juncture of the larger and smaller diameter portions 76 and 77 forms within the projected periphery of the constricted diameter portion 77 a chamber 73′ for receiving the gas generator charge composition in the form of annular disks of annular disks of boron potassium nitrate or other suitable composition as previously described. Disposed radially outwardly of the gas generating chamber formed within the bore 78 is a three-legged pyrotechnic delay column 74′ arranged in a substantially rectangular path about the chamber 73′ having an upper horizontal leg, a vertical leg, a lower horizontal leg and a short vertical leg communicating with the gas generating chamber 73′. One end of each of the three longer legs may extend through the cylindrical periphery of the larger diameter portion 76 of the head closure 28′ and have threaded entrance ends, to facilitate loading of the pyrotechnic composition in the column 74′ and sealing of the column by threading plugs into the threaded entrance thereof. A branch leg extends axially of the head closure 28′ through the rear face thereof from the upper column leg to an actuator 75′ to be imbedded in the solid propellant grain 16 for ignition of the pyrotechnic delay composition at the desired time immediately prior to burn-out of the propellant grain 16.

In the use of this rocket vehicle, the instrument package is mounted on the instrument base plate 60 in any suitable manner, the nose cone 55 is assembled with the instrument base plate 60 by means of the steel balls 66 seated in the apertures 67 and sockets 64, and the nose cone and instrument base plate subassembly is intecoupled with the parachute container 12 and rocket motor section 11 by threading of the mounting nut 68 onto the stem 53a of the anchoring stud 53. Upon launching, the rocket vehicle is propelled to the desired altitude by burning of the end burning solid propellant grain 16 which provides thrust over a relatively long period of time and thus minimizes acceleration loads. In one practical example, the rocket motor is designed to provide about 360 pounds of thrust for a period of 29 seconds, to achieve altitudes in the vicinity of 200,000 feet with up to about a 12.5 pound payload. Immediately prior to burn-out of the propellant grain 16, the actuator 75 at the ignition end of the pyrotechnic delay column 74 is ignited, and following a suitable delay interval determined by the rate of burning of the pyrotechnic composition in the delay column 74 and the length of the delay column, the gas generator charge composition in the chamber 73 is ignited to produce the necessary pressure to shear the pins 42 holding the forward closure 41 fixed relative to the outer parachute container barrel 32 and separate the parachute assembly and payload from the rocket motor case. Upon ignition of the gas generated charge, the gas pressure entrapped within the chamber confined within the piston-forming aft closure 37 of the parachute container section 12 and the head closure 28 of the rocket motor section 11, after shearing of the pins 42, begins forcing the aft closure 37 forwardly relative to the outer barrel 32 and thereby forcing the inner cylinder formed by the split shell halves 34 and 35, the parachute assembly 36, the forward closure 41, and the nose cone and instrument base plate subassembly axially forwardly. The aft closure 37 is secured to the gas generator 72 by means of a lanyard or wire rope 80 suitably anchored to these two elements and having a maximum length to permit movement of the aft closure 37 to a position slightly beyond the forwardmost end of the barrel 32. In practice this lanyard 80 may be an extension of the rope 49 which is anchored intermediate its ends in the closure 37. The burning rate of the gas generating composition, as previously mentioned, is designed to produce a rate of gas generation which will substantially match the volume increase in the confined chamber as the piston travels axially away from the head closure 28, so as to provide sufficiently low acceleration of the instrument package to avoid disturbance or damage to the instruments.

Figure 8:
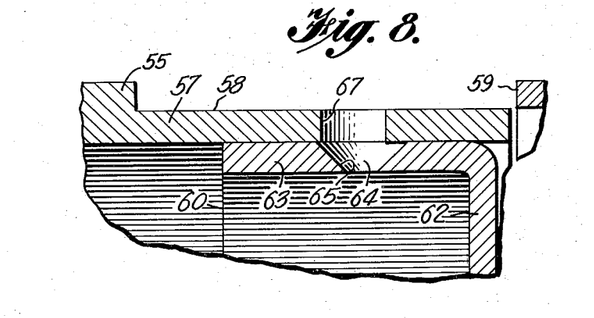
FIGURE 8 is a fragmentary enlarged section view of the adjacent nose cone and instrument base plate section showing the relative forward displacement of the nose cone occurring upon breakage of the cord interconnecting the parachute with the aft closure of the parachute container section.
Figure 9:
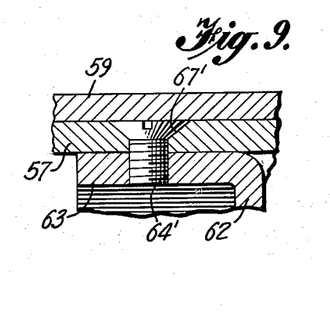
FIGURE 9 is a fragmentary enlarged section view similar to FIGURE 7 but taken through the tapped openings in the nose cone and instrument base.

As the inner cylinder formed by the split shell halves 34 and 35 clears the forward edge of the apron portion 59 of the parachute container outer barrel 32, the split shell halves fly apart, the folded parachute pack elements 47 fan outwardly, and the parachute is properly expanded and deployed in the rarefied atmosphere by the expelling movement of the parachute assembly and the inertia of the nose cone 55 and interconnected instrument base plate 60 traveling forwardly relative to the rocket motor case. When the cords 46, 52 and 48, 59 and the lanyard 80 are payed out to their full extent, the low breaking strength cotton cord 46 is broken as a result of the shock produced by the sudden restraint of the lanyard, thus freeing the parachute and the nose cone and instrument base plate subassembly from the rocket motor case. Also, the inertia of the nose cone traveling forward when the lanyard shock occurs effects a slight relative movement forwardly of the nose cone 55 relative to the flanges 63 of the instrument base plate 60, whereby the apertures 67 in which the steel balls 66 are seated are displaced slightly forwardly of the sockets 64 in the flanges 63, to the condition illustrated diagrammatically in FIGURE 8. The steel balls 66, being now free of restraint since they are no longer retained in their associated sockets and apertures by the apron portion 59 of the outer parachute container barrel 32, are propelled out of their associated sockets and apertures, in part by the relative rearward movement of the conical walls 65 which force the balls outwardly to progressively higher points on the inclined surfaces of the wall 65 freeing the nose cone 55 for further relative movement from the instrument base plate 60 due to its inertia and the drag of the parachute and loss of inertia energy of the base plate due to shock, and thereby exposing the instrument package which is suspended by the cord 52 from the parachute 45.

By means of this arrangement and sequence of action, the parachute package is ejected from the forwardly opening outer parachute container barrel 32 and interconnected rocket motor case in a unique manner to achieve sufficient velocity to insure expansion and effective deployment of the parachute at the high altitudes at which separation is to occur and yet achieve this at sufficiently low acceleration to avoid disturbance or damage to the instruments. This method by which the parachute is expelled is of significant practical advantage in that it provides for a positive separation of the parachute from the rocket motor. While the specific example herein described employs a low breaking strength cord interconnecting the crown of the parachute and the piston-forming aft closure, effecting deployment of the parachute may be achieved in many cases without a connection between the parachute and aft closure. Separation of the nose cone from the instrument package is, of course, desirable in many experiments and measurement applications to eliminate the heating effects of the nose cone on the installation and to expose the sensors to the elements. Where these considerations are not important, the nose cone may be maintained in assembled relation with the instrument base plate 60 by the use of flat headed screws tapped into the socket 64' of the flange 63 and openings 67' in the nose cone.

While several specific embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A rocket vehicle for transporting a payload to high altitude and expelling the payload from the rocket vehicle, comprising an elongated tubular case having a rocket motor section in the trailing end thereof and a parachute section adjacent the leading end thereof, a nose cone having a rearwardly opening payload housing chamber therein bounded at the rear of the nose cone by an axially elongated annular outer wall portion of the nose cone and a transverse payload base plate forming a rear closure for the payload housing chamber, means interconnecting the outer wall portion of the nose cone with said base plate, said rocket motor section including an outer cylindrical shell and a rocket motor housed therein having an elongated end-burning propellant grain and a transverse head closure at the forward end of the rocket motor section fixed to said shell, said parachute section including an outer cylindrical tubular wall conforming to the diameter of said shell and aligned therewith defining with said head closure a forwardly opening cylindrical chamber, a forward closure for said parachute section normally secured to said outer cylindrical wall by frangible connector means and a folded parachute and a surrounding inner cylindrical sleeve formed of axially split sections slidably fitted with said outer cylindrical wall, an axially movable piston member slidably interfitted with the inner surface of said outer cylindrical wall between said sleeve and said head closure spaced from the latter to define a pressure chamber therebetween, coupling means connecting said payload base plate with said forward closure and said forward closure with said parachute, gas generating means for producing pressure within said pressure chamber to axially force the piston forwardly against said parachute and said sleeve and force the latter against said forward closure to break said frangible connector means and expell the sleeve and folded parachute and forward closure through the forward end of said cylindrical chamber, and a lanyard interconnecting said piston with said fixed closure for limiting expulsion movement of said piston to a limit position near the forward end of said parachute section and having a length to accommodate movement of said piston to said limit position.

2. In a rocket vehicle, the combination recited in claim 1, including a low breaking strength cord interconnecting said piston closure with the crown of said parachute to break the interconnection between said parachute and said piston closure when said lanyard is payed out to said limit position for aiding deployment of said parachute.

3. A rocket vehicle for transporting a payload to high altitude and expelling the payload from the rocket vehicle, comprising an elongated tubular case having a rocket motor section in the trailing end thereof and a parachute section adjacent the leading end thereof, a nose cone having a rearwardly opening payload housing chamber therein bounded at the rear of the nose cone by an axially elongated annular outer wall portion of the nose cone and a transverse payload base plate forming a rear closure for the payload housing chamber, means interconnecting the outer wall portion of the nose cone with said base plate, said rocket motor section including an outer cylindrical shell and a rocket motor housed therein having an elongated end-burning propellant grain and a transverse head closure at the forward end of the rocket motor section fixed to said shell, said parachute section including an outer cylindrical tubular wall conforming to the diameter of said shell and aligned therewith defining with said head closure a forwardly opening cylindrical chamber, a forward closure for said parachute section normally secured to said outer cylindrical wall by frangible connector means and a folded parachute and a surrounding inner cylindrical sleeve formed of axially split sections slidably fitted with said outer cylindrical wall, an axially movable piston member slidably interfitted with the inner surface of said outer cylindrical wall between said sleeve and said head closure spaced from the latter to define a pressure chamber therebetween, coupling means connecting said payload base plate with said forward closure and said forward closure with said parachute, gas generating means for producing pressure within said pressure chamber to axially force the piston forwardly against said parachute and said sleeve and force the latter against said forward closure to break said frangible connector means and expell the sleeve and folded parachute and forward closure through the forward end of said cylindrical chamber, pyrotechnic delay means communicating with said gas generating means and including an ignition end embedded in said propellant grain to be ignited by the burning of the propellant grain at a preselected time prior to burn-out of the propellant grain and activate the gas generating means a selected time delay interval thereafter, a lanyard interconnecting said piston with said fixed closure for limiting expulsion movement of said piston to a limit position near the forward end of said parachute section and having a length to accommodate movement of said piston to said limit position, and a low breaking strength cord interconnecting said piston with the crown of the parachute to break the interconnection therebetween responsive to the expulsion inertia of said forward closure and elements connected therewith when said lanyard is payed out to said limit position.

4. A rocket vehicle for transporting a payload to high altitude and expelling the payload from the rocket vehicle, comprising an elongated tubular case having a rocket motor section in the trailing end thereof and a parachute section adjacent the leading end thereof, a nose cone having a rearwardly opening payload housing chamber therein bounded at the rear of the nose cone by an axially elongated annular outer wall portion of the nose cone and a transverse payload base plate forming a rear closure for the payload housing chamber, means interconnecting the outer wall portion of the nose cone with said base plate, said rocket motor section including an outer cylindrical shell and a rocket motor housed therein having an elongated end-burning propellant grain and a transverse head closure at the forward end of the rocket motor section fixed to said shell, said parachute section including an outer cylindrical tubular wall conforming to the diameter of said shell and aligned therewith defining with said head closure a forwardly opening cylindrical chamber, a forward closure for said parachute section normally secured to said outer cylindrical wall by frangible connector means and a folded parachute and a surrounding inner cylindrical sleeve formed of axially split sections slidably fitted with said outer cylindrical wall, an axially movable piston member slidably interfitted with the inner surface of said outer cylindrical wall between said sleeve and said head closure spaced from the latter to define a pressure chamber therebetween, coupling means connecting said payload base plate with said forward closure and said forward closure with said parachute, gas generating means for producing pressure within said pressure chamber to axially force the piston forwardly against said parachute and said sleeve and force the latter against said forward closure to break said frangible connector means and expell the sleeve and folded parachute and forward closure through the forward end of said cylindrical chamber, pyrotechnic delay means communicating with said gas generating means and including an ignition end embedded in said propellant grain to be ignited by the burning of the propellant grain at a preselected time prior to burn-out of the propellant grain and activate the gas generating means a selected time delay interval thereafter, said gas generating means having a burning rate which will produce a rate of gas generation within said pressure chamber substantially matching the volume increase therein as said piston travels forwardly through said cylindrical chamber, a lanyard interconnecting said piston with said fixed closure for limiting expulsion movement of said piston to a limit position near the forward end of said parachute section and having a length to accommodate movement of said piston to said limit position, and a low breaking strength cord interconnecting said piston with the crown of the parachute to break the interconnection therebetween responsive to the expulsion inertia of said forward closure and elements connected therewith when said lanyard is payed out to said limit position.

5. A rocket vehicle for transporting a payload to high altitude and expelling the payload from the rocket vehicle, comprising an elongated tubular case having a rocket motor section in the trailing end thereof and a parachute section adjacent the leading end thereof, a nose cone having a rearwardly opening payload housing chamber therein bounded at the rear of the nose cone by an axially elongated annular outer wall portion of the nose cone and a transverse payload base plate forming a rear closure for the payload housing chamber, means interconnecting the outer wall portion of the nose cone with said base plate, said rocket motor section including an outer cylindrical shell and a rocket motor housed therein having an elongated end-burning propellant grain and a transverse head closure at the forward end of the rocket motor section fixed to said shell, said parachute section including an outer cylindrical tubular wall conforming to the diameter of said shell and aligned therewith defining with said head closure a forwardly opening cylindrical chamber, a forward closure for said parachute section normally secured to said outer cylindrical wall by shear pins spaced rearwardly from the forward end of said outer cylindrical wall to define a forwardly opening shallow cup-shaped cavity at the leading end thereof, the portion of said outer cylindrical wall projecting forwardly of said forward closure forming an annular surround for said cavity, a folded parachute and a surrounding inner cylindrical sleeve formed of axially split sections slidably fitted with said outer cylindrical wall, an axially movable piston member slidably interfitted with the inner surface of said outer cylindrical wall between said sleeve and said head closure spaced from the latter to define a pressure chamber therebetween, coupling means connecting said payload base plate with said forward closure and said forward closure with said parachute, gas generating means for producing pressure within said pressure chamber to axially force the piston forwardly against said parachute and said sleeve and force the latter against said forward closure to break said shear pins and expell the sleeve and folded parachute and forward closure through the forward end of said cylindrical chamber, a lanyard interconnecting said piston with said fixed closure for limiting expulsion movement of said piston to a limit position near the forward end of said parachute section and having a length to accommodate movement of said piston to said limit position, a low breaking strength cord interconnecting said piston with the crown of the parachute to break the interconnection therebetween responsive to the expulsion inertia of said forward closure and elements connected therewith when said lanyard is payed out to said limit position, said outer wall portion at the rear of the nose cone having an axially elongated external rabbet for fully receiving in lapped relation therein the annular surround portion of said tubular wall of the parachute section with said nose cone wall portion nested within said cup-shaped cavity, said payload base plate having an axially projecting annular peripheral flange underlying the lapped portions of said annular surround portion and said nose cone wall portion and having a plurality of outwardly opening circumferentially spaced sockets therein extending along radial axes, said wall portion of said nose cone having a plurality of circumferentially spaced openings therein registering with said sockets, a plurality of rigid interlocking balls seated in the registered sockets and openings and traversing the separation between said nose cone wall portion and said annular flange, said annular surround portion of said tubular wall of the parachute section extending in outwardly covering relation to said registered sockets and openings when the rear of said nose cone is nested within said cup-shaped cavity to restrain said interlocking balls therein, and said nose cone and payload base plate being shifted forwardly of said annular surround portion upon projection of said piston forwardly through said cylindrical chamber to expose said openings in said nose cone wall portion and free said interlocking balls to be dislodged therefrom to disengage the nose cone from said payload base plate.

6. A rocket vehicle for transporting a payload to high altitude and expelling the payload from the rocket vehicle, comprising an elongated tubular case having a rocket motor section in the trailing end thereof and a parachute section adjacent the leading end thereof, a nose cone having a rearwardly opening payload housing chamber therein bounded at the rear of the nose cone by an axially elongated annular outer wall portion of the nose cone and a transverse payload base plate forming a rear closure for the payload housing chamber, means interconnecting the outer wall portion of the nose cone with said base plate, said rocket motor section including an outer cylindrical shell and a rocket motor housed therein having an elongated end-burning propellant grain and a transverse head closure at the forward end of the rocket motor section fixed to said shell, said parachute section including an outer cylindrical tubular wall conforming to the diameter of said shell and aligned therewith defining with said head closure a forwardly opening cylindrical chamber, a forward closure for said parachute section normally secured to said outer cylindrical wall by frangible connector means spaced rearwardly from the forward end of said outer cylindrical wall to define a forwardly opening shallow cup-shaped cavity at the leading end thereof, the portion of said outer wall projecting forwardly of said forward closure forming an annular surround for said cavity, a folded parachute and a surrounding inner cylindrical sleeve formed of axially split sections slidably fitted with said outer cylindrical wall, an axially movable piston member slidably interfitted with the inner surface of said outer cylindrical wall between said sleeve and said head closure spaced from the latter to define a pressure chamber therebetween, coupling means connecting said payload base plate with said forward closure and said forward closure with said parachute, gas generating means for producing pressure within said pressure chamber to axially force the piston forwardly against said parachute and said sleeve and force the latter against said forward closure to break said frangible connector means and expel the sleeve and folded parachute and forward closure through the forward end of said cylindrical chamber, a lanyard interconnecting said piston with said fixed closure for limiting expulsion movement of said piston to a limit position near the forward end of said parachute section and having a length to accommodate movement of said piston to said limit position, and a low breaking strength cord interconnecting said piston with the crown of the parachute to break the interconnection therebetween responsive to the expulsion inertia of said forward closure and elements connected therewith when said lanyard is payed out to said limit position, said outer wall portion at the rear of the nose cone having an axially elongated external rabbet for fully receiving in lapped relation therein the annular surround portion of said outer tubular wall of the parachute section with said nose cone wall portion nested within said cup-shaped cavity, said coupling means connecting said base plate with said forward closure including a threaded stud non-rotatably mounted on said forward closure at the center thereof and projecting into said cup-shaped cavity and a nut fixed on said payload base plate to be threaded onto said stud and interlock said base plate and forward closure together upon insertion of said outer wall portion of the nose cone into said cavity and rotation of the nose cone relative to the parachute section.

7. A rocket vehicle for transporting a payload to high altitude and expelling the payload from the rocket vehicle, comprising an elongated rocket-shaped body having a forward nose cone and an elongated aft body section releasably interconnected with said nose cone, said aft body section including a rocket motor means in the rearmost portion thereof, said nose cone terminating rearward in an annular rim having an external rabbet therein extending axially forwardly from the rearmost end of the nose cone, said aft body section terminating in its forward end in a forwardly opening annular apron complementary to said rabbet surrounding a forwardly opening cup-shaped chamber for receiving the annular rim of said nose cone in nested relation therein with said apron fully interfitted within said rabbet, a transverse wall disposed within said nose cone underlapping the annular rim, means connecting said transverse wall with said body, said transverse wall having a plurality of outwardly opening circumferentially spaced sockets therein extending along radial axes, the annular rim of said nose cone lapping said transverse wall having a plurality of circumferentially spaced openings therein registering with said sockets, a plurality of rigid interlocking bodies seated in the registered sockets and openings to interlock said nose cone and transverse wall together, said annular apron extending in outwardly covering relation to said registered sockets and openings.

8. In a rocket vehicle, the combination recited in claim 7, wherein said interlocking bodies are in the form of rigid metal spheres having a diameter conforming substantially to the diameter of said openings in said nose cone rim, means for axially displacing said nose cone and transverse wall forwardly of said aft body section, when the rocket vehicle is in flight to project said registered openings and socket to uncovered positions forwardly of said apron, said spheres spanning substantially the full combined depth of the registered pairs of openings and sockets and being free to be discharged outwardly through said openings by the forces on said rocket vehicle when said openings attain said uncovered position.

9. A rocket vehicle for transporting a payload to high altitude and expelling the payload from the rocket vehicle, comprising an elongated tubular case having a rocket motor section in the trailing end thereof and a parachute section adjacent the leading end thereof, a hollow nose cone having a transverse payload base plate forming a rear closure, a rocket motor including an elongated end-burning propellant grain in said rocket motor section, said parachute section including an outer shell and a fixed transverse rear wall which define a forwardly opening cylindrical chamber, an axially movable piston closure within said chamber spaced forwardly of said rear wall providing a pressure chamber therebetween, an axially ejectable parachute package of generally cylindrical configuration coaxially disposed within said cylindrical chamber and including a folded parachute therein, forward closure means for said parachute section normally secured to said outer shell by frangible connector means, means interconnecting the nose cone with the transverse payload base plate, means connecting said base plate with said forward closure and said forward closure with said parachute for suspending said forward closure and base plate from said parachute when the latter is expelled from the rocket vehicle, gas generating means for producing pressure within said pressure chamber to break said frangible means and expell said parachute package and forward closure axially through the open end of said cylindrical chamber, pyrotechnic delay means communicating with said gas generating means and including an ignition and embedded in said propellant grain to be ignited by the burning of the propellant grain at a preselected time prior to burn-out of the propellant grain and activate the gas generating means a selected time delay interval thereafter, lanyard means interconnecting said piston closure with said fixed rear wall to limit axial expulsion movement of said piston closure, and a low breaking strength connector means interconnecting said piston closure with the crown of said parachute to break the interconnection between said parachute and said piston closure when said lanyard is payed out its full extent for aiding deployment of said parachute.

10. In a rocket vehicle, the combination recited in claim 9 wherein said gas generating means has a burning rate which will produce a rate of gas generation within said pressure chamber substantially matching the volume increase therein as said piston closure travels forwardly through said cylindrical chamber.

References Cited in the file of this patent

UNITED STATES PATENTS

| | | |
|---|---|---|
| 1,978,641 | Martin | Oct. 30, 1934 |
| 2,503,269 | Hickman | Apr. 11, 1950 |
| 2,873,648 | Musser et al. | Feb. 17, 1959 |

OTHER REFERENCES

Aviation Week, July 29, 1957, page 57, article titled (Low Cost Rocket Vehicle Urged for High-Altitude Weather Data). Copy in Div. 10.